United States Patent [19]

Li

[11] 3,822,591

[45] July 9, 1974

[54] PRECISION, FLUID FLOW METERING DEVICE

[76] Inventor: Chou H. Li, 379 Elm Dr., Roslyn, N.Y. 11576

[22] Filed: Mar. 14, 1972

[21] Appl. No.: 234,539

[52] U.S. Cl. ............ 73/194 M, 73/231 M, 73/239, 73/254, 73/261
[51] Int. Cl............................ G01f 1/00, G01f 3/00
[58] Field of Search..... 73/194 R, 194 M, 229, 230, 73/231 M, 232, 239, 254, 261

[56] References Cited
UNITED STATES PATENTS

| | | | |
|---|---|---|---|
| 1,185,736 | 6/1916 | Trood | 73/230 |
| 2,944,421 | 7/1960 | Case et al. | 73/230 |
| 3,187,571 | 6/1965 | Borel | 73/230 |
| 3,370,465 | 2/1968 | Belle | 73/230 |

*Primary Examiner*—Richard C. Queisser
*Assistant Examiner*—John P. Beauchamp

[57] ABSTRACT

A device for metering fluid flow which comprises a fluid flow chamber, fluid inlet and outlet connected thereto, and a moving member cyclically movable with an operative clearance therein and through momentum exchange mechanically interacting with the fluid flow therethrough. The entire circumferential region of the moving member is relatively and automatically recedable from, and advanceable toward, the nearby inside wall of the flow chamber in accordance with, respectively, increasing and decreasing rates of the fluid flow. This feature controllably changes the circumferential clearance therebetween and insures that the cyclic speed of the member is proportional to the fluid flow rate, even at very low flow rates. The member may be provided with frictionless gas or liquid bearings for improved measuring accuracy and reliability. The device may also be mechanically temperature-compensated for measuring fluid mass flow, rather than fluid volumetric flow.

39 Claims, 8 Drawing Figures

PATENTED JUL 9 1974　　3,822,591

PRECISION, FLUID FLOW METERING DEVICE

This invention relates to precision, fluid flow metering devices such as flowmeters and, more particularly, to precision flowmeters accurate over wide ranges of flow rates and temperatures.

The invention is applicable to many different types of mass, volumetric, and velocity or rate fluid flow metering devices. However, for the purpose of illustration, it will be described mostly in connection with a few commonly used flowmeters.

The conventional flowmeters as described by, e.g., A. Linford in Fluid Measurement and Meters (E. & F. N. Spon Ltd., London, 1961), are always subjected to serious wear problems on the rotors or other moving parts; and generally measure only the volumetric fluid flow since no allowance is made for the thermal expansion of the fluid. These meters yield fairly accurate results only within certain ranges of specified flow rates. In particular, at low flow rates, the fluid leakages (or seepages) across the rotors or other moving members are often appreciable or even predominant, so that these flowmeters underread or even do not read at all.

To overcome the foregoing and other difficulties, the general object of the invention is to provide a fluid flowmeter with a controllably variable circumferential clearance between the moving member and the nearby inside wall of the flow chamber. This clearance is substantial at high flow rates to curtail wear and erosion, but is reduced and minimal at low flow rates when the fluid leakage is the least tolerable. This variable clearance is achieved by yieldable circumferential region on the member, by yieldable nearby inside wall of the chamber, or by both. For measuring fluid mass flow, temperature-compensating mechanism is provided to modify the frictional drag on the movement of the moving member.

For the purpose of illustrating the invention, there is shown in the drawing the forms which are presently preferred. It is to be understood that this invention is not necessarily limited to the precise arrangements and instrumentalities here shown.

According to Lindford, flowmeters can be divided into two main groups: (1) displacement and (2) inferential. Group 1 comprises meters which are volumetric in operation, the cyclic displacement of the rotor being directly proportional to the volume of fluid passing through the meter during each cycle. Group 2 embraces current-type flowmeters; they measure the flow velocity and from this measurement infer the volume of flow.

Figure 1:
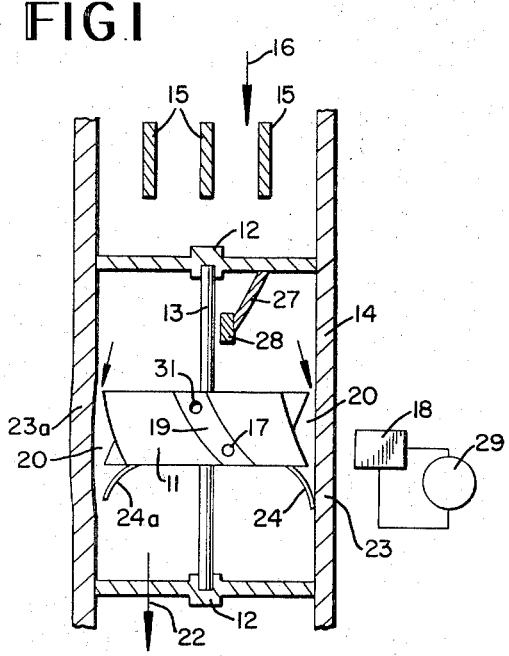
FIG. 1 is a cross-section of a propeller-type inferential flowmeter improved according to the invention.

FIG. 1 shows a typical, propeller-type inferential flowmeter. Here, the rotor 11, of helix construction, is mounted with bearings 12 on a vertical (or horizontal) stationary or axially non-shiftable and non-displaceable axis 13. This axis is fixed along the centerline of the tubular flow chamber 14 and, hence, coincides with the fluid flow direction. Straightening vanes 15 on the fluid inlet side 16 of the rotor minimize possible rotative components of fluid flow. Under pressure and kinetic energy of the flowing fluid, the rotor is subjected to a driving torque and undergoes a rotary motion through its momentum exchange with the flowing fluid. The rotational speed of the rotor is roughly proportional to the fluid flow rate. The linearity and repeatability between the flow rate and rotor rotational speed can be established, but only with constant operating conditions and over specified ranges of flow rates. The rotor blades may be made of a (ferro) magnetic material or may, instead, carry permanent magnets 17. An external magnetic pick-up system 18 senses the rotation of the rotor through the wall of the flow chamber 14. The output is usually in the form of electrical pulses from the magnetic pickup, with a frequency proportional to the flow rate. These electrical pulses are integrated to show the total fluid volumetric flow on the flow indicator 29.

Notice that there is appreciable circumferential clearance 20 between the (circumferential) rotor tip and the nearby inside wall of the flow chamber. This clearance arises from finite machining and assembling tolerances between the moving elements and the flow chamber, from the ever-present but critical wear and erosion, and from differential thermal expansion of the meter components. The presence of the clearance causes fluid leakage across the rotor in the direction of fluid flow (as shown by arrows). Such leakage, while introducing only a relatively small error at high flow rates, is completely intolerable at low flow rates. In fact, the conventional flowmeters invariably underread, or even do not read at all, at these low flow rates.

According to this invention, the rotor tip, i.e., the circumferential region of the rotor, is made to be relatively recedable from, and advanceable toward, the nearby inside wall of the flow chamber in accordance with the flow rate. This feature changes the circumferential clearance 20 therebetween and insures that the rotational speed of the rotor is proportional to the fluid flow rate, even at the low flow rates when the conventional meter is inaccurate or even inoperable. In one form of the improved meter, the rotor tip is rigid while the nearby inside wall 23 of the chamber 24 is controllably movable relative thereto. Specifically, the nearby inside wall 23 is yieldable and bulges (See left inside wall 23a) under the pressure of the fluid flow, thereby increasing the circumferential clearance to minimize the troublesome wear problem. At reduced flow rates and fluid pressures, however, the yieldable inside wall 23 straightens itself out (See right wall 23). The circumferential clearance 20 and the resultant fluid leakage across the rotor then becomes minimal, or even is substantially completely eliminated. For illustration, the nearby inside wall 23 here is made of a suitably resilient or pliable material, such as rubber. Such a flow chamber 14 can be simply a piece of rubber tubing. Alternately, the nearby inside wall is rigid while the rotor tip is yieldable relative thereto, to change monotonically the circumferential clearance 20 which decreases in the fluid flow rate. The yieldable rotor tip as shown in FIG. 1 comprises a resilient annular ring (or blade or membrane) 24 attached to the rotor tip. This resilient ring 24 is specially shaped and curved with its concave side facing toward the fluid outlet side 22, so that the pressure of the flowing fluid at high flow rates urges the yieldable ring, blade, or membrane 24 to recede from the inside wall (See left side 24a). At reduced flow rates and fluid pressures, however, the yieldable ring 24 flexes out (See right side 24). The circumferential clearance 20 and the resultant fluid leakage across the rotor then becomes minimal. The added-on ring, blade, or membrane 24 may even be designed or selected to contribute to improving the metering accuracy even at moderate or high flow rates, in cases where the relation between the flow rate and the speed of rotation of the rotor is not exactly linear. This is done by adjusting the shape and resiliency of the ring 24.

Figure 2:
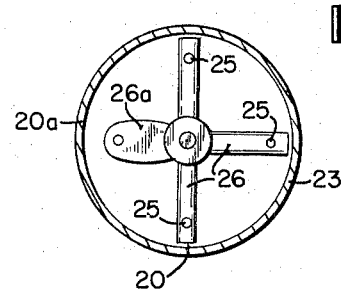
FIG. 2 shows the operation of my new, hollow, flexible rotor blades.

Another species of the yieldable rotor blade, shown in FIG. 2, is particularly useful in connection with the stationary wall 23 of a hollow but rigid body or housing of constant cross-section that forms the fluid flow chamber 14. Such blades are hollow and flexible, and provided with openings 25 facing the fluid inlet 16 so that the pressure head of the flowing fluid (i.e., $\Delta p = $ fluid velocity$^2$ 2 × gravitational constant) is transmitted through these openings into the interior of the hollow blades 26. At high flow rates, then, the blades bulge under the pressure and recede from the inside chamber wall (See left blade 26a). At low flow rates, on the other hand, the blades 26 return to their normal shapes and positions so as to be close to the chamber wall 23, thereby minimizing the circumferential clearance 20.

The added-on ring or blade 24 covers the entire circumferential region of the moving member (rotor 11 in FIG. 1 or piston 48 in FIG. 8) so as to achieve balanced forces on the moving member laterally of the axis of movement. The yieldable rotor blades 26 of FIG. 2 or resilient vanes 42 of FIG. 5, however, does not cover the entire circumferential region at any given time instant or rotor position. Still, because of the symmetrically placed, multiple rotor blades 26 or vanes 42, substantially balanced forces occur laterally of the direction of the cyclic movement of the rotor to maintain alignment thereof relative to the inside wall 23 of the flow chamber 14.

It is well known that most fluids change densities with temperature. A few fluids under some conditions (e.g., water between 0°–4° C or 32.0°–39.2° F) shrink and densify with increasing temperature. But most fluids shrink and densify with decreasing temperature. One cubic foot of water, e.g., weighs 62.347, 62.356, 62.341, 62.299, 62.236, and 62.151 pounds respectively at 32°, 40°, 50°, 60°, 70°, and 80° F. The volumetric flowmeter of FIG. 1 may be modified according to another aspect of the invention to measure fluid mass flows, even when the measured fluid has appreciable temperature variations. The modification comprises the provision of mechanical, movement-modifying means responsive to temperature of the flowing fluid, to change directly and monotonically the rotational speed of the rotor (at a given rate of volumetric flow) with increases in the fluid temperature. For water between 0°–4° C, this temperatureresponsive means should decrease monotonically the rotational speed of the rotor (at a given volumetric flow rate) with decreases in the fluid temperature. For water above 4° C and for most other fluids, the provided means should increase monotonically the same speed with decreases in the fluid temperature. The provided means, as shown in FIG. 1, is a suitable bimetallic element in the form of a pressing member 27 and a frictional pad 28 pressing against the axis 13, or other mechanism to increase friction to the rotor rotation with increases in the fluid temperature. Alternately, the bimetallic element may be built into the rotor helix blades so as to change their geometries, i.e., curvatures, and to reduce, with increasing fluid temperature, the driving torque on the rotor as produced by the momentum of the flowing fluid.

Figure 3:
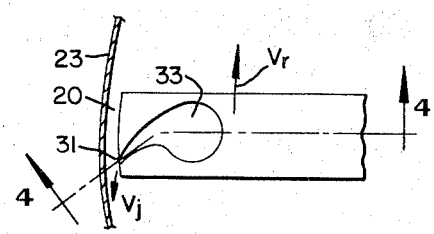
FIG. 3 shows another type of new rotor blade having special discharge openings for discharging fluid jets therethrough.
Figure 4:
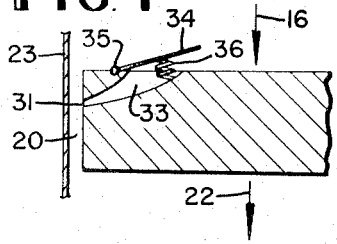
FIG. 4 is a cross-section of the rotor blade of FIG. 3, taken along the line 4—4.

The improved rotor of FIG. 1 is, in addition, provided with special discharge openings 31 to discharge a portion of the flowing fluid through the rotor tip into the circumferential clearance 20 (FIGS. 3 and 4). The discharged fluid jets act as frictionless gas or liquid bearings to provide positive fluid lubrication, and also to center, align, and stabilize the rotor relative to the flow chamber 14. In this way, rotor wear and erosion is minimized, and measuring accuracy and reliability and long metering lives are assured. Preferentially, the resistance to discharge of the fluid from the discharge openings 31 into the circumferential clearance 20 is substantially less than the resistance to fluid leakage across the rotor through the same clearance. This is achieved by fluid passageways 33 which have large cross-sections relative to the circumferential clearance 20. The discharge also preferably has a tangential component (See FIG. 3) directed ($V_j$) oppositely of the direction of rotor rotation ($V_r$), so as to increase the rotor rotation through the reactive forces generated therefrom. This additional driving torque is particularly valuable at low flow rates when, without it, the rotor rotation is likely to be erratic, unstable, and/or completely absent. If the meter is to have circumferential fluid discharge only at low flow rates, valves 34 are provided which are hinged at 35 and normally urged to open by the compression springs 36 but are closed under the pressure of the flowing fluid at high flow rates. If, however, wear is a more serious problem than fluid leakage or discharge opening maintanance, then the valves 34 should be so designed as to open only at low flow rates. In either case, the resiliency of the springs 36 determines at which preselected flow rates the valves are to be opened or closed.

Figure 5:
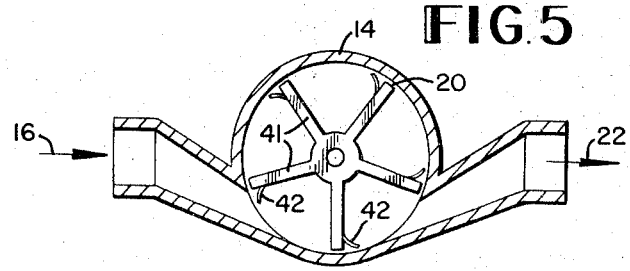
FIG. 5 shows a single-jet fan-type, inferential flowmeter improved according to the invention.

FIG. 5 shows a single-jet fan type, inferential meter. Here the liquid or other fluid is tangentially injected into the flow chamber 14. The fluid outlet 22 is arranged opposite from the inlet 16, and there is appreciable clearance between the edges of the rotor blades 41 and the top, bottom, and sides of the flow chamber. Consequently, the speed of rotation of the rotor is determined not only by the fluid velocity but also by the physical dimensions of the flow chamber and rotor blades. The flow quantity is "inferred" from the velocity measurement. To minimize the circumferential clearance 20 in this meter, the inside wall of the flow chamber 14 is made yieldable under fluid pressure within, and/or special resilient vanes 42 are provided at the tips of the rotor blades 41. As shown, the special vanes 42 have their convex sides facing the fluid inlet side 16, so as to recede from the inside wall under fluid pressure at high flow rates, but to return toward the inside wall when the flow rates are low. In addition, temperature-responsive friction pads may also be provided to slow down the rotor with increasing fluid temperatures.

Figure 6:
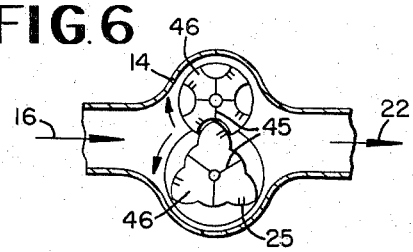
FIG. 6 shows an improved displacement flowmeter employing the helix principle.
Figure 7:
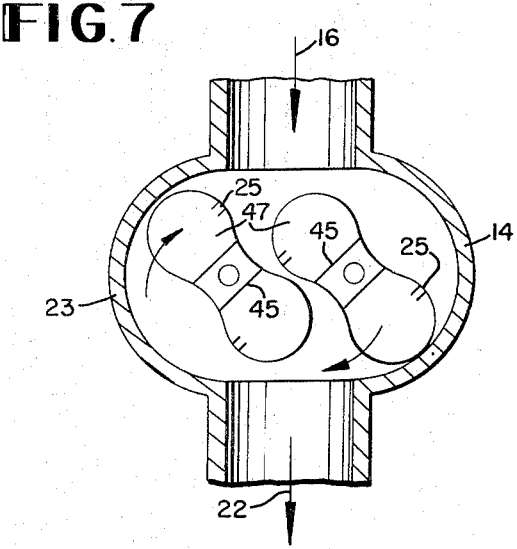
FIG. 7 shows an improved gear-pump-type flowmeter useful for gas measurements.
Figure 8:
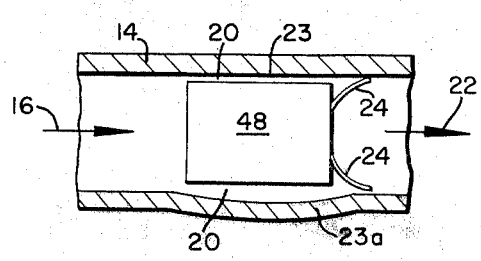
FIG. 8 shows an improved piston-type displacement flowmeter.

The application of this invention to displacement type flowmeters is shown in FIGS. 6–8. FIG. 6 shows a displacement meter employing the helix principle and a purely rotary movement. The moving element in this meter consists of two fluted rotors of different diameters and synchronized in rotation with a small but operative clearance between the helical surfaces. Either the wall of the flow chamber 14, or the fluted rotors 46, are yieldable to controllably change the clearance between the rotors and the flow chamber. In addition, the rotors may be hollow and flexible, but partitioned by partitions 45, and provided with openings 25 facing the fluid inlet side 16 so as to achieve the same result in clearance control. FIG. 7 shows a gear-pump-type flowmeter commonly used for gas measurements. This gas flowmeter consists of two impellers 47 rotating on two shafts that are geared together. The two impellers are so shaped and mounted that they always move fittingly with an operative clearance relative to each other and also relative to the inside wall of the flow chamber 14. Here again, the chamber wall 23 can be made yieldable, or the impellers can be hollow and flexible and provided with partitions 45 and openings 25 to transmit the fluid pressure therethrough. FIG. 8 shows a piston-type displacement flowmeter provided with yieldable wall 23a on the flow chamber 14, or with yieldable annular ring 24, to control the circumferential clearance 20 according to the flow rate. Even the circular-piston-type or nutating-disc type displacement flowmeters can be similarly improved by equivalent mechanisms in accordance with the principle of the invention.

The moving members in the devices of FIGS. 1-8 cyclially move about their respective, stationary axes of movement. In a nutating-disc type of fluid metering device as described, e.g., in A. Linford's book, the moving member (i.e., nutating disc) cyclically moves about an axis of movement containing thereon a single stationary point about which the disc nutates. In all these precision, fluid flow metering devices, the moving member cyclically moves fittingly (with an operative circumferential clearance) in the flow chamber and through momentum exchange mechanically interacting with the fluid flow through the flow chamber. In the case of fluid flowmeters, for example, the moving member acquires a portion of the kinetic energy of the flowing fluid through momentum exchange therewith so as to move cyclically under the pressure or influence of the flowing fluid.

It is to be noted that any fluctuations in the fluid flow are instantly sensed. The sensed fluctuations are neither distorted, nor modified, nor even delayed. Instantaneous responses to these fluctuations can, therefore, occur to initiate, immediately, the required changes in the circumferential clearance. This is because the clearance-control components i.e., the yieldable flow chamber wall and/or the yieldable circumferential region of the moving member, are very simply constructed and, furthermore, located inside the flow chamber exactly where critical and precision fluid flow metering is done, and not somewhere outside the flow metering device.

Thus, this invention has solved the problem of parts wear in precision, fluid flow metering device, partly through the variable but controllable clearance between the critical moving parts and partly through the use of fluid bearings. In addition, mass flow can now be measured even with conventional volumetric flowmeters but modified by suitable temperature-responsive mechanisms.

The invention, as described above, is not to be construed as limited to the particular forms disclosed herein, since these are to be regarded as illustrative rather than restrictive.

Having thus described my invention, I claim:

1. A precision, fluid flow metering device comprising: a hollow but rigid body or housing forming a fluid flow chamber; fluid inlet and outlet connected thereto; and a moving member cyclically movable fittingly therein and through momentum exchange mechanically interacting with the fluid flow therethrough, the circumferential region of the moving member being yieldable and adapted to automatically recede from and advance toward the nearby, rigid inside wall of the flow chamber in response to variations in the fluid flow rate, so as to change accordingly the circumferential clearance therebetween and to insure that the cyclic speed of the moving member is proportional to the fluid flow rate.

2. A precision, fluid flow metering device comprising: a hollow body or housing forming a fluid flow chamber; fluid inlet and outlet connected thereto; and a moving member cyclically movable fittingly therein about an axis of movement and through momentum exchange mechanically interacting with the fluid flow therethrough, the axis of movement containing at least a stationary point thereon, the circumferential region of the moving member being automatically and relatively recedable from, and advanceable toward, the nearby inside wall of the flow chamber in response to variations in the fluid flow rate, so as to change accordingly the circumferential clearance therebetween and to insure that the cyclic speed of the moving member is proportional to the fluid flow rate, the relatively recedable and advanceable circumferential region being substantially symmetrically distributed with respect to the axis of movement so as to achieve substantially balanced forces laterally of the direction of the movement and to maintain alignment of the moving member relative to the inside wall thereby achieving improved metering accuracy and reliability.

3. The device of claim 2 characterized by its being a fluid flowmeter wherein the moving member cyclically moves fittingly inside the flow chamber under the pressure of the fluid flow therethrough.

4. The device of claim 2 including means operatively associated with the moving member and communicative with the flowing fluid inside the flow chamber for instantly and accurately sensing the fluid flow fluctuations within the flow chamber and for instantaneously responding thereto by initiating, immediately, the required changes in the circumferential clearance.

5. The device of claim 2 wherein the flow chamber has a constant cross-section and wherein within a specified range of the fluid flow rates the circumferential region is automatically and relatively recedable from and advanceable toward the nearby inside wall of the flow chamber in response to, respectively, increasing and decreasing fluid flow rates so as to increase and decrease, respectively, the circumferential clearance therebetween whereby the cyclic movement of the moving member is more linearly related to the amount of the fluid flow.

6. The device of claim 2 wherein the moving member cyclically moves about a stationary and axially non-displaceable axis of movement.

7. The device of claim 2 wherein the moving member moves about an axis of movement and the entire circumferential region is automatically movable relative to the inside wall in response to varying fluid flow rates so as to achieve balanced forces on the moving member laterally of the axis of movement.

8. The device of claim 2 wherein the flow chamber comprises a tube of a pliable material, the inner surface of the tube forming the relatively movable inside wall.

9. The device of claim 2 wherein the moving member is a linearly reciprocating piston in a piston-type, fluid metering device.

10. The device of claim 2 wherein the moving member comprises an axially fixed rotor.

11. The device of claim 2 wherein the moving member comprises a nutating disc in a nutating disc type, fluid metering device.

12. The device of claim 2 wherein the nearby inside wall is yieldable under the pressure of the fluid flow, and at reduced flow rates and fluid pressures the yieldable inside wall returns toward the circumferential region thereby minimizing the circumferential clearance and the critical fluid leakage across the moving member.

13. The device of claim 2 wherein the nearby inside wall is rigid and the circumferential region is yieldable relative thereto.

14. The device of claim 13 wherein the circumferential region is adapted to change monotonically the circumferential clearance with decreases in the fluid flow rate.

15. The device of claim 14 wherein the yieldable circumferential region monotonically decreases the circumferential clearance with decreases in the fluid flow rate.

16. The device of claim 1 wherein the circumferential region has on the fluid outlet side thereof resilient, curved blade means convex toward the fluid inlet side, so that at high fluid flow rates the pressure of the flowing fluid urges the yieldable circumferential region to recede from the inside wall, whereas at reduced fluid flow rates and fluid pressures the yieldable circumferential region returns toward the inside wall thereby minimizing the circumferential clearance and the resultant fluid leakage across the moving member.

17. The device of claim 1 wherein the flowing fluid has appreciable temperature variations and including means responsive to temperature of the fluid flow to decrease monotonically the speed of the cyclical movement at a given volumetric flow rate in accordance with increases in the fluid temperature.

18. The device of claim 17 wherein the temperature-responsive, movement-modifying means comprises a frictional mechanism to increase friction to the cyclic movement with increases in the fluid temperature.

19. The device of claim 17 characterized by its being a flowmeter having a rotor as the moving member thereof and wherein the temperature-responsive means comprises a torque-modifying mechanism to reduce with increasing fluid temperature the driving torque on the rotor as produced by the momentum of the flowing fluid.

20. The device of claim 19 wherein the torque-modifying mechanism comprises a bimetallic element.

21. The device of claim 2 including means for discharging a portion of the fluid flow out of the circumferential region into the circumferential clearance to provide positive fluid lubrication therein.

22. The device of claim 17 including means for inactivating the discharging means at preselected volumetric fluid flow rates.

23. The device of claim 21 wherein the discharging means comprises wall means defining at least an elongated discharge opening located in the moving member and having one end thereof terminating at the circumferential clearance to discharge the portion of the fluid flow thereinto.

24. The device of claim 23 wherein the cross-sectional area of the elongated discharge opening is large relative to that of the circumferential clearance so that the resistance to discharge of the fluid from the circumferential region into the circumferential clearance is substantially less than the resistance of fluid leakage across the moving member through the same clearance.

25. The device of claim 21 wherein the moving member is a rotor and the circumferential fluid discharge has a tangential component directed oppositely of the direction of the rotor rotation so as to increase the speed of the rotor rotation through the reactive forces generated therefrom.

26. The device of claim 1 characterized by its being a fluid flowmeter wherein the moving member cyclically moves fittingly inside the flow chamber under the pressure of the fluid flow therethrough.

27. The device of claim 1 wherein the flow chamber has a constant cross-section.

28. The device of claim 1 wherein the moving member moves cyclically about an axis of movement containing at least a stationary point thereon.

29. The device of claim 1 wherein the moving member moves about an axis of movement and wherein the recedable and advanceable circumferential region is substantially symmetrically distributed relative to the axis so as to achieve substantially balanced forces laterally of the direction of the movement of the moving member and to maintain alignment of the moving member relative to the inside wall thereby improving metering accuracy and reliability.

30. The device of claim 1 wherein the entire circumferential region is adapted to automatically recede from and advance toward the nearby, rigid inside wall of the flow chamber in response to, respectively, increasing and decreasing rates of the fluid flow so as to increase and decrease, respectively, the circumferential clearance therebetween thereby minimizing the critical fluid leakage across the moving member at reduced fluid flow rates and, simultaneously, improving the linear relationship between the cyclic movement of the moving member and the amount of the fluid flow through the flow chamber.

31. The device of claim 1 wherein the circumferential region of the moving member comprises hollow and flexible means provided thereon with at least one opening communicative with the fluid in the flow chamber for transmitting the pressure head of the flowing fluid therethrough to the interior of the flexible means, at high fluid flow rates the pressure head therein is increased to the extent to cause the flexible means to bulge and recede from the inside wall thereby increasing the circumferential clearance while at low fluid flow rates the same pressure head is reduced to the extent to cause the flexible means to return to its normal shape thereby reducing the circumferential clearance and minimizing the critical fluid leakage across the moving member.

32. The device of claim 1 including indicating means operatively coupled with the moving member for indicating the amount of fluid which has passed through the flow chamber in terms of the number of cyclic movements of the moving member, the indicating means comprising: magnetic device attached to the moving member to move cyclically therewith; external electromagnetic sensing system for sensing the cyclic movement of the magnetic device on the moving member through the wall of the flow chamber; and means for integrating the electromagnetically sensed signals to show the total amount of fluid flow through the flow chamber.

33. The device of claim 1 including mechanism operatively associated with the moving member and communicative with the flowing fluid inside the flow chamber for instantly and accurately sensing the fluid flow fluctuations within the flow chamber and for instantaneously responding thereto by initiating, immediately, the required changes in the circumferential clearance.

34. The device of claim 20 wherein the moving member comprises a rotor having a number of helical rotor blades, and wherein the torque-modifying mechanism comprises the same number of bimetallic elements, each such element being physically integral with every helical rotor blade to change, with increasing fluid temperature, the curvature thereof and to reduce the driving torque on the rotor as produced by the momentum of the flowing fluid at a given volumetric fluid flow rate.

35. The device of claim 21 wherein the moving member has an axis of movement and the circumferential fluid discharge is distributed substantially symmetrically relative to the axis to achieve balanced forces on the moving member and to center, align, and stabilize the moving member relative to the flow chamber thereby improving metering accuracy and reliability.

36. The device of claim 22 wherein the inactivating means comprises an on-off fluid control valve attached to the moving member; and means sensitive to the fluid flow rates to turn the control valve from one of the on-off positions to the other.

37. The device of claim 22 wherein the inactivating means comprises an on-off fluid control valve hingedly attached to the moving member; and resilient means normally urging the control valve to assume one of the on-off positions, fluid flow rate changes exceeding a prescribed level turning the control valve to the other of on-off positions against the force of resiliency thereby regulating the circumferential fluid discharge in response to changing fluid flow rates.

38. A precision, fluid flow metering device for a fluid subjected to appreciable temperature variations comprising: a hollow body or housing forming a fluid flow chamber; fluid inlet and outlet connected thereto; a moving member cyclically movable fittingly with an operative circumferential clearance therein about an axis of movement containing at least a stationary point thereon and through momentum exchange mechanically interacting with the fluid flow therethrough; the circumferential region of the moving member being automatically and relatively recedable from and advanceable toward the nearby inside wall of the flow chamber in response to, respectively, increasing and decreasing rates of the fluid flow; temperature-responsive, movement-modifying mechanism mechanically coupled with the moving member for direct mechanical force interaction therewith, the movement-modifying mechanism being responsive to the temperature variations to change directly the speed of the cyclic movement at a given volumetric flow rate; and indicating means operatively coupled with the moving member for indicating the mechanically modified movement thereof.

39. The device of claim 1 including means for discharging a portion of the fluid flow out of the circumferential region into the circumferential clearance to provide positive fluid lubrication therein.

* * * * *

UNITED STATES PATENT OFFICE
CERTIFICATE OF CORRECTION

Patent No. 3,822,591            Dated July 9, 1974

Inventor(s) Chou H. Li

It is certified that error appears in the above-identified patent and that said Letters Patent are hereby corrected as shown below:

Column 2, line 54, "24" should read --14--. Column 3, line 3, "which" should read --with--; line 29, "velocity$^2$ 2" should read --velocity$^2$/2--; and line 67, "temperatureresponsive" should read --temperature responsive--. Column 4, line 49, "whicn" should read --which--. Claim 22, line 1, "17" should read --21--.

Signed and sealed this 8th day of October 1974.

(SEAL)
Attest:

McCOY M. GIBSON JR.
Attesting Officer

C. MARSHALL DANN
Commissioner of Patents